(12) United States Patent
Kogo (10) Patent No.: US 11,753,532 B2
(45) Date of Patent: Sep. 12, 2023

(54) RESIN COMPOSITION, AND COMMUNICATION CABLE AND WIRE HARNESS USING SAME

(71) Applicant: Yazaki Corporation, Tokyo (JP)

(72) Inventor: Kosuke Kogo, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 17/474,236

(22) Filed: Sep. 14, 2021

(65) Prior Publication Data

US 2022/0081541 A1 Mar. 17, 2022

(30) Foreign Application Priority Data

Sep. 16, 2020 (JP) .................................. 2020-155576

(51) Int. Cl.
| | |
|---|---|
| *C08L 23/06* | (2006.01) |
| *C08K 5/02* | (2006.01) |
| *C08L 23/12* | (2006.01) |
| *C08L 25/10* | (2006.01) |
| *C08K 3/22* | (2006.01) |

(52) U.S. Cl.
CPC ................ *C08L 23/06* (2013.01); *C08K 5/02* (2013.01); *C08L 23/12* (2013.01); *C08L 25/10* (2013.01); *C08K 2003/2224* (2013.01); *C08K 2003/2237* (2013.01); *C08L 2203/202* (2013.01)

(58) Field of Classification Search
CPC .......... C08L 23/06; C08L 23/12; C08L 23/04; C08L 23/10; C08L 23/16; C08L 9/06; C08L 51/06; C08K 5/02; C08K 2003/2224; C08K 2003/2237; C08K 3/22
See application file for complete search history.

(56) References Cited

U.S. PATENT DOCUMENTS

| | | | |
|---|---|---|---|
| 6,211,291 B1 * | 4/2001 | Rolland ................. | C08L 23/08 525/74 |
| 2009/0054553 A1 | 2/2009 | Meng et al. | |
| 2013/0008691 A1 * | 1/2013 | Shimada ................. | H01B 3/28 524/375 |
| 2016/0186556 A1 * | 6/2016 | Rasmus ................. | G06F 17/11 703/2 |
| 2018/0114610 A1 | 4/2018 | Uegaki et al. | |
| 2019/0027272 A1 | 1/2019 | Uegaki et al. | |
| 2020/0118708 A1 | 4/2020 | Uegaki et al. | |
| 2021/0005348 A1 | 1/2021 | Uegaki et al. | |
| 2021/0065926 A1 | 3/2021 | Kogo | |

FOREIGN PATENT DOCUMENTS

| | | | |
|---|---|---|---|
| CN | 101835831 A | 9/2010 | |
| CN | 112447312 A | 3/2021 | |
| JP | 2017-188431 A | 10/2017 | |
| JP | 2017188431 A * | 10/2017 | ............. H01B 11/02 |

(Continued)

*Primary Examiner* — Mark S Kaucher
(74) *Attorney, Agent, or Firm* — Sughrue Mion, PLLC (57) ABSTRACT

A communication cable includes 51 to 85 parts by mass of a polyolefin resin, 15 to 49 parts by mass of a flexible resin, 10 to 80 parts by mass of a halogenated flame retardant per 100 parts by mass of a total of the polyolefin resin and the flexible resin, and at least one of titanium oxide or metal hydroxide, the resin composition having a permittivity of 2.5 to 3.5.

7 Claims, 2 Drawing Sheets

(56) References Cited

FOREIGN PATENT DOCUMENTS

| | | |
|---|---|---|
| JP | 2019-26692 A | 2/2019 |
| KR | 10-2015-0074557 A | 7/2015 |
| KR | 10-2015-0135730 A | 12/2015 |
| KR | 20150135730 A * | 12/2015 |
| WO | 2012/127785 A1 | 9/2012 |

* cited by examiner

RESIN COMPOSITION, AND COMMUNICATION CABLE AND WIRE HARNESS USING SAME

CROSS-REFERENCE TO RELATED APPLICATIONS

The present application is based on, and claims priority from Japanese Patent Application No. 2020-155576, filed on Sep. 16, 2020, the entire contents of which are incorporated herein by reference.

TECHNICAL FIELD

The present disclosure relates to a resin composition, and a communication cable and a wire harness each using the resin composition.

BACKGROUND

Cables for advanced electronics information and communication required for automatic driving of automobiles have been developed. JP 2017-188431A discloses a communication wire having a twisted pair of insulated wires each including conductors and an insulation coating covering the outer periphery of the conductors, and the communication wire has characteristic impedance in the range of 100±10Ω. JP 2017-188431A describes that transmission characteristics, such as characteristic impedance, need to be strictly controlled in electric wires used for high-speed communication.

SUMMARY

Here, cables to be mounted on automobiles need to satisfy the required characteristics specified in the international standard to ensure high reliability in the vehicle-mounted environment. Moreover, in cables for advanced electrics information and communication, such as automatic driving of automobiles, it is necessary to control electrical characteristics of the insulator material to control the characteristic impedance of cables. That is, to control the characteristic impedance, it is necessary to adjust the permittivity of the insulator material to an appropriate value. However, it has been difficult to adjust the permittivity to an appropriate value while satisfying the characteristics of the above standard, because the permittivity is an inherent value due to various materials constituting the insulator material.

The present disclosure has been made in response to the above issue. It is an object of the present disclosure to provide a resin composition to be used as an insulator material for communication cables, which satisfy communication characteristics while ensuring reliability required for automotive wires. Further, it is an object of the present disclosure to provide a communication cable and a wire harness each using the resin composition.

A resin composition according to some embodiments includes 51 to 85 parts by mass of a polyolefin resin, 15 to 49 parts by mass of a flexible resin, 10 to 80 parts by mass of a halogenated flame retardant per 100 parts by mass of a total of the polyolefin resin and the flexible resin, and at least one of titanium oxide or metal hydroxide, the resin composition having a permittivity of 2.5 to 3.5.

According to some embodiments, there are provided a resin composition to be used as an insulator material of a communication cable that satisfies communication characteristics while ensuring reliability required for automobile electric wires, and a communication cable and a wire harness using the resin composition.

DETAILED DESCRIPTION

A resin composition according to a present embodiment, a communication cable and a wire harness each using the resin composition are described below with reference to drawings. Note that the dimensional ratios in the drawings are exaggerated for convenience of explanation and may differ from the actual ratios.

[Resin Composition]

The resin composition according to the present embodiment is usable as an insulator material in a communication cable installed in automobiles. The resin composition includes at least a polyolefin resin, a flexible resin, and a flame retardant.

(Polyolefin Resin)

The polyolefin resin is a polymer of monomers including olefin. The polyolefin resin may be a polymer of olefin alone, or a copolymer of olefin and a monomer other than olefin. A polymer of olefin alone may be of one type of olefin or of two or more types of olefin. The polyolefin resin may be modified with maleic acid or the like, or may not be modified. Examples of the polyolefin resin include a polyethylene resin, and a polypropylene resin.

Examples of the polyethylene resin include a resin having an ethylene component unit of 50 mol % or more. Specifically, examples of the polyethylene resin include a high-density polyethylene (HDPE), a low-density polyethylene (LDPE), a linear low-density polyethylene (LLDPE), an ethylene-vinyl acetate copolymer, an ethylene-propylene copolymer, an ethylene-propylene-butene-1 copolymer, an ethylene-butene-1 copolymer, an ethylene-hexene-1 copolymer, an ethylene-4-methylpentene-1 copolymer, an ethylene-octene-1 copolymer, and a mixture of some of them.

Examples of the polypropylene resin include homopolypropylene (homo PP), random polypropylene (random PP), block polypropylene (block PP), and a copolymer with a component of other olefin or the like that is copolymerizable with propylene. Examples of other olefin copolymerizable with propylene include alpha-olefin, such as ethylene, 1-butene, isobutylene, 1-pentene, 3-methyl-1-butene, 1-hexene, 3,4-dimethyl-1-butene, 1-heptene, and 3-methyl-1-hexene.

Preferably, the content of the polyolefin resin is 51 parts by mass or more and 85 parts by mass or less per 100 parts by mass of the total of the polyolefin resin and the flexible resin. Setting the content of the polyolefin resin to 51 parts by mass or more improves abrasion resistance of the resin composition. Setting the content of the flexible resin to 85 parts by mass or less improves low-temperature resistance of the resin composition.

(Flexible Resin)

Examples of the flexible resin to be used include chlorinated polyolefin, such as chlorinated polyethylene, acrylic rubber, such as NBR (nitrile rubber), and one or more of the following thermoplastic olefin elastomers or thermoplastic styrene elastomers. The flexible resin may be modified with maleic acid or the like, or may not be modified.

The thermoplastic olefin elastomer includes a hard segment made from an olefin resin and a soft segment made from a rubber. As the thermoplastic olefin elastomer, a polymer alloy in which a soft segment is finely dispersed as a domain in a matrix of a hard segment is typical, but a copolymer of a hard segment and a soft segment can also be used. Examples of the olefin resin to be used include polyethylene, and polypropylene. Examples of the rubber to be used include natural rubber (NR), isoprene rubber (IR), butadiene rubber (BR), styrene-butadiene copolymer rubber (SBR), acrylonitrile-butadiene copolymer rubber (NBR), chloroprene rubber (CR), butyl rubber (IIR), ethylene-propylene rubber (EPM), and ethylene-propylene-diene rubber (EPDM). These may be used alone or in combination of two or more.

Examples of the thermoplastic styrene elastomer include a block copolymer or a random copolymer having a hard segment made from an aromatic vinyl polymer and a soft segment made from a conjugated diene polymer. A monomer making up the aromatic vinyl polymer may be α-alkyl-substituted styrene, such as styrene, α-methylstyrene, α-ethylstyrene, or α-methyl-p-methylstyrene, aromatic alkyl-substituted styrene, such as o-methylstyrene, m-methylstyrene, p-methylstyrene, 2,4-dimethylstyrene, ethylstyrene, 2,4,6-trimethylstyrene, o-t-butylstyrene, p-t-butylstyrene, or p-cyclohexylstyrene, or the like. The conjugated diene polymer may be a copolymer of at least one of butadiene or isoprene, or the copolymer partially hydrogenated.

The thermoplastic styren elastomer may be a block copolymer of at least one selected from the group consisting of polystyrene-polybutadiene-polystyrene (SBS), polystyrene-polyisoprene-polystyrene (SIS), polystyrene-polyisobutylene-polystyrene (SIBS), polystyrene-poly(ethylene-butylene)-polystyrene (SEBS), polystyrene-poly(ethylene-butylene)-crystalline polyolefin (SEBC), and polystyrene-poly(ethylene-propylene)-polystyrene (SEPS).

Preferably, the content of the flexible resin is 15 parts by mass or more and 49 parts by mass or less per 100 parts by mass of the total of the polyolefin resin and the flexible resin. Setting the content of the flexible resin to 15 parts by mass or more improves the low-temperature resistance of the resin composition. Setting the content of the flexible resin to 49 parts by mass or less improves the abrasion resistance of the resin composition.

(Flame Retardant)

The resin composition according to the present embodiment includes a flame retardant in addition to the polyolefin resin and the flexible resin. The flame retardant may be, for example, at least one of an organic flame retardant or an inorganic flame retardant. Examples of the organic flame retardant to be used include a halogenated flame retardant, such as a brominated flame retardant and a chlorinated flame retardant. Examples of the inorganic flame retardant to be used include at least one metal hydroxide selected from the group consisting of aluminum hydroxide, magnesium hydroxide, and calcium hydroxide. These flame retardants may be used alone or in combination of two or more. The flame retardant may include the organic flame retardant and the inorganic flame retardant, for example.

Preferably, the resin composition according to the present embodiment includes at least a halogenated flame retardant as the flame retardant. The halogenated flame retardant scavenges hydroxyl radicals promoting combustion of the thermoplastic resin and suppresses the combustion of the resin composition. The halogenated flame retardant may be, for example, a compound in which at least one or more halogens are substituted in an organic compound. Examples of the halogenated flame retardant include a fluorinated flame retardant, a chlorinated flame retardant, a brominated flame retardant, and an iodinated flame retardant. The halogenated flame retardant may be used alone or in combination of two or more. The halogenated flame retardant is preferably a brominated flame retardant or a chlorinated flame retardant, more preferably a brominated flame retardant.

Examples of the chlorinated flame retardant include chlorinated polyethylene, chlorinated paraffin, and perchlorocyclopentadecane.

Examples of the brominated flame retardant include 1,2-bis(bromophenyl)ethane, 1,2-bis(pentabromophenyl)ethane, hexabromobenzene, ethylenebis-dibromonolbornanedicarboximide, ethylenebis-tetrabromophthalimide, tetrabromobisphenol S, tris(2,3-dibromopropyl-1)isocyanurate, hexabromocyclododecane (HBCD), octabromophenyl ether, tetrabromobisphenol A (TBA), TBA epoxy oligomer or polymer, TBA-bis(2,3-dibromopropyl ether), decabromodiphenyl oxide, polydibromophenylene oxide, bis(tribromophenyl) ethane, ethylenebis-pentabromobenzene, dibromoethyl-dibrocyclohexane, dibromoneopentyl glycol, tribromophenol, tribromophenolallyl ether, tetradecabromodiphenoxybenzene, 2,2-bis(4-hydroxy-3,5-dibromophenyl)propane, 2,2-bis(4-hydroxyethoxy-3,5-dibromophenyl)propane, pentabromophenol, pentabromotoluene, pentabromodiphenyl oxide, hexabromodiphenyl ether, octabromodiphenyl ether, decabromodiphenyl ether, octabromodiphenyl oxide, dibromoneopentyl glycol tetracarbonate, bis(tribromophenyl)fumaramide, and N-methylhexabromophenylamine. Preferably, the flame retardant includes 1,2-bis(pentabromophenyl)ethane, and tetrabromobisphenol A. Such a flame retardant has a low permittivity and thus gives flame retardancy while preventing an increase in viscosity and permittivity of the resin composition.

The bromine content of the brominated flame retardant is preferably 50% to 90%, more preferably 70% to 90%. Setting the bromine content of the brominated flame retardant in such a range enhances the hydroxyl radical scavenging effect and thus further improves the flame retardancy of the resin composition. The bromine content of the brominated flame retardant means the percentage of the total bromine atom amount making up the brominated flame retardant to the molecular weight of the brominated flame retardant.

When the viscosity of the resin composition is high, extrusion processability of the resin composition is improved by reducing the content of the inorganic flame retardant and increasing the content of the organic flame retardant. When the flame retardant contains an organic flame retardant and an inorganic flame retardant, the ratio of the inorganic flame retardant to the organic flame retardant may be within the range of from 0.75 to 40 and may be within the range of from 1 to 10, for example.

Preferably, the content of the halogenated flame retardant in the resin composition is 10 to 80 parts by mass per 100 parts by mass of the total of the polyolefin resin and the flexible resin. Setting the content of the halogenated flame retardant to 10 parts by mass or more improves the flame retardancy of the resin composition. Setting the content of the halogenated flame retardant to 80 parts by mass or less reduces the cost of the resin composition since it is not necessary to use more flame retardant than necessary while maintaining mechanical characteristics.

Here, the metal hydroxide is a general-purpose flame retardant and is relatively inexpensive than the brominated flame retardant. The metal hydroxide acts as a permittivity modifier because the permittivity of the metal hydroxide is higher than that of a general polyolefin resin. Therefore, preferably, the resin composition according to the present embodiment includes the metal hydroxide in addition to the halogenated flame retardant. Examples of the metal hydroxide to be used include one or more of metal compounds having a hydroxyl group or water of crystallization, such as magnesium hydroxide ($Mg(OH)_2$), aluminum hydroxide ($Al(OH)_3$), calcium hydroxide ($Ca(OH)_2$), basic magnesium carbonate ($mMgCO_3 \cdot Mg(OH)_2 \cdot nH_2O$), hydrated aluminum silicate (aluminum silicate hydrate, $Al_2O_3 \cdot 3SiO_2 \cdot nH_2O$), hydrated magnesium silicate (magnesium silicate pentahydrate, $Mg_2Si_3O_8 \cdot 5H_2O$). Among them, magnesium hydroxide is particularly preferable as the metal hydroxide.

The content of the metal hydroxide in the resin composition is preferably more than 0 parts by mass and 45 parts by mass or less, more preferably 10 parts by mass or more and 45 parts by mass or less, per 100 parts by mass of the total of the polyolefin resin and the flexible resin. Setting the content of the metal hydroxide to more than 0 parts by mass controls the permittivity of the resin composition from being too low and improves the flame retardancy. Setting the content of the metal hydroxide to 45 parts by mass or less ensures the battery fluid resistance.

(Flame Retardant Aid)

The resin composition according to the present embodiment may include a flame retardant aid in addition to the flame retardant. The flame retardant aid improves the flame retardancy of the resin composition together with the flame retardant. Examples of the flame retardant aid to be used include antimony trioxide. The antimony trioxide improves the flame retardancy of the resin composition when used in combination with the halogen flame retardant. The content of the flame retardant aid in the resin composition is preferably 0.1 to 30 parts by mass, more preferably 1 to 15 parts by mass, per 100 parts by mass of the total of the polyolefin resin and the flexible resin.

(Inorganic Filler)

The resin composition according to the present embodiment may contain an inorganic filler to adjust the permittivity. Examples of the inorganic filler include a metal oxide, such as aluminum oxide and titanium oxide, and a titanate compound, such as barium titanate and strontium titanate. Preferably, the inorganic filler is titanium oxide.

The content of the inorganic filler in the resin composition is preferably more than 0 parts by mass and 60 parts by mass or less, more preferably 10 parts by mass or more and 60 parts by mass or less, per 100 parts by mass of the total of the polyolefin resin and the flexible resin. Setting the content of the inorganic filler to more than 0 parts by mass controls the permittivity of the resin composition from being too low. Setting the content of the inorganic filler to 60 parts by mass or less controls the permittivity from being too high.

The resin composition according to the present embodiment may include various additives in an appropriate amount not to interfere with the effect of the present embodiment, other than the polyolefin resin, the flexible resin, the flame retardant, and the inorganic filler. Examples of the additives include an antioxidant, a processing aid, a crosslinker, a metal deactivator, an anti-aging agent, a filler, a reinforcing agent, an ultraviolet absorber, a stabilizer, a plasticizer, a pigment, a dye, a colorant, an antistatic agent, and a foaming agent.

(Antioxidant)

The antioxidant reduces, for example, oxidation of the resin composition, and the like. Examples of the antioxidant include a radical chain inhibitor, such as a phenolic antioxidant and an amine antioxidant, a peroxide decomposer, such as a phosphorus antioxidant and a sulfur antioxidant, and a metal deactivator, such as a hydrazine antioxidant and an amine antioxidant. The antioxidant may be used alone or in combination of two or more.

The amount of the antioxidant added may be adjusted in consideration of antioxidant effect and defects due to bleed-out. The content of the antioxidant in the resin composition is preferably 0.5 to 10 parts by mass per 100 parts by mass of the total of the polyolefin resin and the flexible resin. Setting the content of the antioxidant to 0.5 parts by mass or more improves heat resistance. Setting the content of the antioxidant to 10 parts by mass or less reduces the bleed-out.

(Processing Aid)

A processing aid is added for gum produced in extrusion molding and keeping the shape of extrusion molding products. The processing aid may include at least one of a metallic soap or a polymer lubricant. The content of the processing aid in the resin composition is preferably 0.01 to 10 parts by mass, more preferably 0.1 to 5 parts by mass, per 100 parts by mass of the total of the polyolefin resin and the flexible resin.

The resin composition according to the present embodiment has a permittivity of 2.5 to 3.5. The permittivity of the resin composition is appropriately adjustable according to the content of a metal hydroxide or an inorganic filler included in the resin composition. Setting the permittivity to 2.5 or more makes the thickness of a sheath 20 of a communication cable 100 easy to manufacture, which is described later, while satisfying the standard of ISO 21111-8, thereby improving the production efficiency of the communication cable 100. Setting the permittivity of the resin composition to 3.5 or less makes the sheath 20 thinner and controls the outer diameter of the communication cable 100 from becoming too large or the weight from becoming too large.

The resin composition according to the present embodiment is prepared by melting and kneading the above-described resin composition, and known means can be used for the method. For example, the resin composition can be obtained by preblending using a high-speed mixing apparatus, such as a Henschel mixer, and then kneading using a known kneader, such as a Banbury mixer, a kneader, or a roll mill.

Thus, the resin composition according to the present embodiment includes 51 to 85 parts by mass of the polyolefin resin, 15 to 49 parts by mass of the flexible resin, 10 to 80 parts by mass of the halogenated flame retardant per 100 parts by mass of the total of the polyolefin resin and the flexible resin, and at least one of titanium oxide or metal hydroxide, and the resin composition has a permittivity of 2.5 to 3.5. Since the resin composition according to the present embodiment includes predetermined amounts of the polyolefin resin, the flexible resin, and the halogenated flame retardant, and at least one of titanium oxide or metal hydroxide, the resin composition ensures reliability, such as durability required for automotive electric wires. Since setting the permittivity of the resin composition to 2.5 to 3.5, the resin composition is applicable to a communication cable including conductors of the smallest diameter of 0.13 sq defined in ISO21111-8. Then, a range of characteristic impedance 90 to 110Ω required for the communication cable is satisfied.

[Electric Wire]

Figure 1:
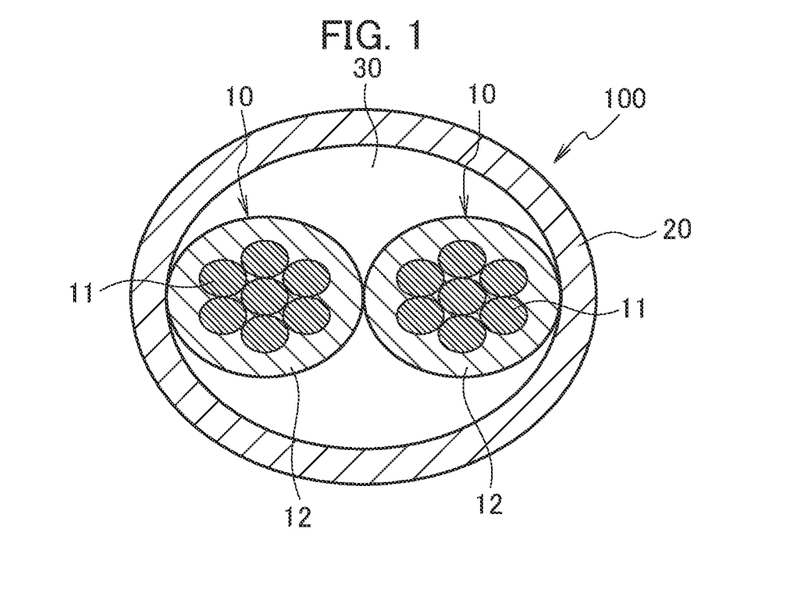
FIG. 1 is a schematic sectional view of an example of a communication cable according to a present embodiment.

Next, an electric wire using the resin composition according to the present embodiment is described. As illustrated in FIG. 1, the electric wire 10 is formed by coating conductors 11 with an insulation coating layer 12 formed by the resin composition according to the present embodiment. The electric wire 10 is obtained by coating the conductors 11 with the above-described resin composition by using an extruder or the like in a predetermined manner.

The conductor 11 may be an element wire, or a collective stranded wire formed by bundling multiple element wires. The conductor 11 may be a stranded wire, or a composite stranded wire formed by bundling multiple collective stranded wires. The material of the conductor 11 is not limited. It is preferably at least one conductive metallic material selected from the group consisting of copper, a copper alloy, aluminum, and an aluminum alloy.

The diameter of the conductor 11 is not limited. It is preferably 0.370 mm or more and 0.512 mm or less, more preferably 0.440 mm or more and 0.460 mm or less. Setting the diameter of the conductor 11 to 0.370 mm or more reduces the resistance of the conductor 11. Setting the diameter of the conductor 11 to 0.512 mm or less facilitates the wiring of the electric wire 10 in a narrow and short path.

The thickness of the insulation coating layer 12 is not limited. It is preferably 0.15 mm or more and 0.22 mm or less, more preferably 0.18 mm or more and 0.22 mm or less. Setting the thickness of the insulation coating layer 12 to 0.15 mm or more effectively protects the conductor 11. Setting the thickness of the insulation coating layer 12 to 0.22 mm or less facilitates the wiring of the electric wire 10 in a narrow path.

[Communication Cable]

Next, a communication cable using the electric wire according to the present embodiment is described. As illustrated in FIG. 1, the communication cable 100 includes the electric wires 10 and the sheath 20 coating outer circumferential surfaces of the electric wires 10. The sheath 20 is in a cylindrical shape and includes a hollow part therein in a diameter direction. The electric wires 10 are disposed in the hollow part, and the sheath 20 extends in an axial direction of the electric wires 10. The thickness of the sheath 20 is not limited and may be 0.1 to 1 mm, for example.

Figure 2:
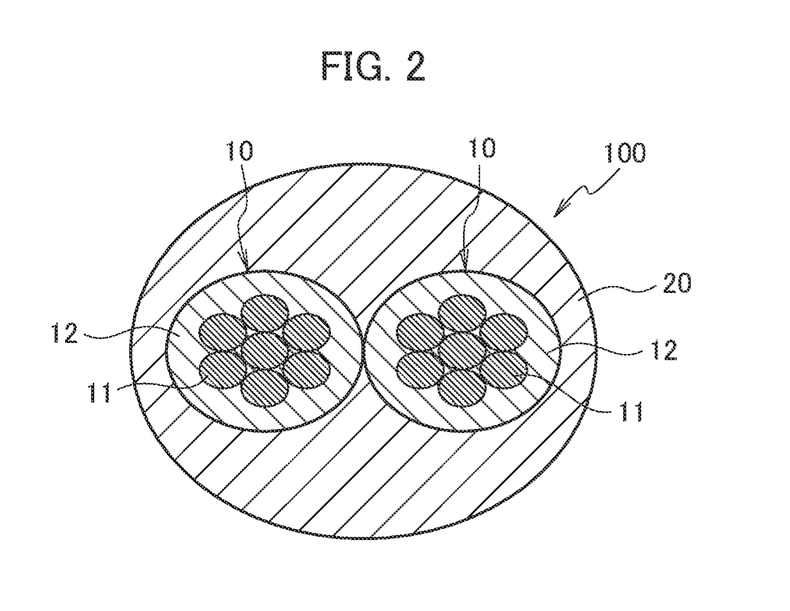
FIG. 2 is a schematic sectional view of another example of the communication cable according to the present embodiment.

In the present embodiment, two electric wires 10 are twisted to form a twisted pair. It is only required that the number of electric wires 10 is at least one. In the present embodiment, as illustrated in FIG. 1, a space 30 is provided between the electric wires 10 and the sheath 20. However, as illustrated in FIG. 2, the communication cable 100 may have no space 30, and the outer surfaces of the wires 10 may be directly coated with the sheath 20. The material of the sheath 20 is not limited and is made from a resin or rubber including a plasticizer, such as a polyvinyl chloride resin. The sheath 20 can be formed by a well-known method, for example, by a general extrusion molding method. Specifically, the sheath can be formed by bundling one or more electric wires 10 and then extruding a material of the sheath 20, such as a vinyl chloride resin composition, to coat the outside thereof.

As described above, the communication cable 100 includes: the electric wires 10 each including the conductors 11 and the insulation coating layer 12 that coats the conductors 11 and is made from the resin composition; and the sheath 20 coating the outer circumferential surfaces of the electric wires 10.

Here, a communication cable installed in automobiles is required to satisfy a predetermined characteristic impedance to enable high-speed communication. As described above, in order to control the characteristic impedance, it is necessary to adjust the permittivity of the insulator material to an appropriate value. However, the characteristic impedance depends not only on the permittivity of the dielectric material such as the resin composition but also on the structure of the communication cable. While lightening and miniaturization are required for communication cables installed in automobiles, it is necessary to increase the finished outer diameter of the insulated wire if the permittivity is large. Therefore, setting the permittivity of the resin composition to 2.5 to 3.5 enables the resin composition to be applied to a communication cable with conductors of the smallest diameter of 0.13 sq defined by ISO 21111-8. Then, the characteristic impedance 90 to 110Ω required for the communication cable is satisfied.

Thus, the communication cable 100 according to the present embodiment has two electric wires 10 twisted, each of which includes the insulation coating layer 12 made from the resin composition. The conductors 11 making up the electric wire of the communication cable 100 each have a cross-sectional area of 0.13 sq, and the thickness of the insulation coating layer 12 coating the conductors 11 is 0.18 to 0.22 mm. The characteristic impedance of the communication cable 100 is 90 to 110Ω. Therefore, the communication cable 100 satisfies the communication characteristics while ensuring the reliability required for wires for automobiles.

[Wire Harness]

Figure 3:
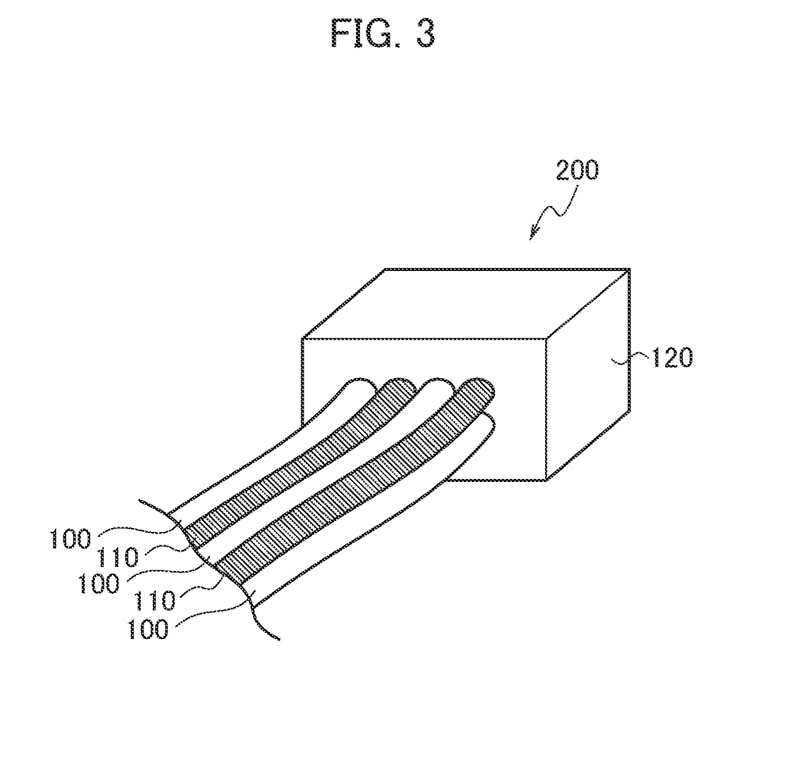
FIG. 3 is a schematic perspective view of an example of a wire harness according to the present embodiment.

Next, a wire harness using the communication cable according to the present embodiment is described. A wire harness 200 according to the present embodiment includes the communication cables 100 and electric wires 110, in which the communication cables 100 and the electric wires 110 are bundled. The communication cables 100 and the electric wires 110 are electrically connected to a connector 120.

The electric wires 110 each may have conductors and a coating layer. The conductors of the wire 110 can be of the same shape and material as the conductors 11 of the electric wire 10 described above. The coating layer of the electric wire 110 can have the same shape as the insulating coating layer 12 of the electric wire 10 described above. The type of resin used for the coating layer of the electric wire 110 may be an olefin resin, such as cross-linked polyethylene or polypropylene, or a known insulation resin, such as vinyl chloride, and the resin may include a plasticizer. As the plasticizer, a known plasticizer added to polyvinyl chloride can be used.

The wire harness 200 according to the present embodiment includes the communication cable 100 described above. Therefore, it is suitably usable as the wire harness 200 provided with the communication cable 100 satisfying the communication characteristics while ensuring the reliability required for electric wires for automobiles.

EXAMPLES

The present embodiment is described below in more detail with reference to examples and comparative examples, but the present embodiment is not limited to these examples.

[Preparation of Sample]

The following was prepared as raw materials for preparing the resin composition.

(Polyolefin Resin)

Homo polypropylene (homo PP): manufactured by Prime Polymer Co., Ltd., Product name: Prime Polypro (registered trademark) E100GV Block polypropylene (block PP): manufactured by Prime Polymer Co., Ltd., Product name: Prime Polypro E150GK Modified homopolypropylene (modified homo PP): manufactured by Addivant, Product name: POLYBOND (registered trademark) 3200

Low density polyethylene (LDPE): manufactured by DOW-MITSUI POLYCHEMICALS CO., LTD., Product name: Mirason (registered trademark) 3530 (Flexible resin)

Thermoplastic olefin elastomer (TPO): manufactured by Prime Polymer Co., Ltd., Product name: Prime TPO (registered trademark) R110E Polystyrene-poly (ethylene-butylene)-polystyrene (SEBS): manufactured by Asahi Kasei, Ltd. Product name: Tuftec (registered trademark) H1221

Maleic anhydride-modified polystyrene-poly (ethylene-butylene)-polystyrene (modified SEBS): manufactured by Asahi Kasei Corporation, Product name: Tuftec (registered trademark) M1943

(Metal Hydroxide)

Magnesium hydroxide ($Mg(OH)_2$): manufactured by Konoshima Chemical Co., Ltd, Product name: YG-O (halogenated flame retardant)

Brominated flame retardant (1,2-bis(pentabromophenyl) ethane): manufactured by Albemarle Corporation, Product name: SAYTEX (registered trademark) 8010

(Inorganic Filler)

Titanium oxide: manufactured by ISHIHARA SANGYO KAISHA, LTD. Product name: CR-63

(Flame Retardant Aid)

Antimony trioxide ($Sb_2O_3$): manufactured by NIHON SEIKO CO., LTD., Product name: PATOX (registered trademark) M (Antioxidant)

Phenolic antioxidant: manufactured by ADEKA CORPORATION, Product name: ADK STAB (registered trademark) AO-20

Phenolic antioxidant: manufactured by ADEKA CORPORATION, Product name: ADK STAB AO-60

(Processing Aid)

Metallic soap: manufactured by KATSUTA KAKO CO., LTD., Product name: EMS-6P

For each of the resin compositions of examples and comparative examples, the above-mentioned raw materials for preparation were mixed according to the blending ratio (mass parts) of the resin composition in Tables 1 to 3 and then kneaded by a batch type or continuous type kneader to produce resin pellets. Then, resin pellets were put into an extruder in which conductors (copper alloy wire) each having a cross-sectional area of 0.13 sq as specified by ISO 21111-8 were set, and extrusion was carried out to prepare a test sample of an electric wire with the thickness of the insulation coating layer adjusted to 0.18±0.1 mm.

[Evaluation]

(Flame Retardancy Test)

Flame retardancy test was conducted on each electric wire of examples and comparative examples in accordance with international standard ISO 6722. Specifically, a test sample of the electric wire was placed in a draft at a 45 degree angle, the inner flame of a Bunsen burner was brought close to the test sample to rest for 15 seconds, and then the flame was removed from the test sample. A test sample was considered acceptable (○) if the flame on the insulator completely vanished within 70 seconds, and if the insulator at the top of the test sample remained unburned at least 50 mm, and a test sample is considered unacceptable (x) if the flame on the insulator remained burnt for 70 seconds or more, or if the insulator at the top of the test sample remained unburned less than 50 mm. The evaluation results are shown in Tables 1 and 2.

(Abrasion Test)

In accordance with the international standard ISO6722, a scrape abrasion test of each examples and comparative examples was conducted. Specifically, a needle was applied perpendicularly to an electric wire, the insulator was worn by reciprocating the needle with a fixed load (4N), and the number of reciprocations until the needle came into contact with a conductor was measured. Those with 100 or more reciprocations before touching the conductor were considered acceptable (○), and those with less than 100 reciprocations were considered unacceptable (x). The evaluation results are shown in Table 1.

(Low Temperature Winding Test)

In accordance with the international standard ISO6722, a low temperature winding test was conducted on each wire of examples and comparative examples. Specifically, a test sample of an electric wire, and a mandrel with an outer diameter five times the outer diameter of the test sample were cooled to −40° C. for 4 hours or more. The test sample was then wound around the mandrel, and the insulation coating layer of the test sample wound was visually observed. For those with no conductor exposure, a withstand voltage test was carried out in which a voltage of 1 kV was applied between the conductor of the test sample and the outer peripheral surface of the insulation coating layer for one minute. Those with no visible conductor exposure and no dielectric breakdown in the withstanding voltage test were considered acceptable (○), and those with visible conductor exposure or dielectric breakdown in the withstanding voltage test were considered unacceptable (x). The evaluation results are shown in Tables 1 and 2.

(Battery Fluid Resistance Test)

In accordance with the international standard ISO 6722, a battery fluid resistance test was conducted on each wire of examples and comparative examples. Specifically, a battery fluid ($H_2SO_4$ solution) having a specific gravity of 1.260±0.005 was sprinkled on a test sample of an electric wire one drop at a time so that the droplets do not contact each other. The test sample was then held in an oven at 90° C. for 8 hours, removed and again sprinkled with battery fluid droplets as described above, and held in an oven at 90° C. for 16 hours. This was repeated as one cycle for a total of 2 cycles, and then the test sample was left at room temperature (23° C.±5° C.) for 30 minutes. The test sample was then wound around a predetermined mandrel, and the insulation coating layer of the test sample wound was visually observed. For those with no exposure of conductors, a withstand voltage test was conducted, and those without break in continuity were considered acceptable (○). Those with exposed conductor and break in continuity were regarded as unacceptable (x). The evaluation results are shown in Tables 1 and 2.

(Dielectric Characteristics)

The permittivity of each resin compositions of examples and comparative examples were measured. Specifically, first, the resin pellets obtained as described above were each processed into a sheet having a length of 80 mm, a width of 3 mm, and a thickness of 0.5 mm by hot pressing. The permittivity of each sheet was measured at a frequency of 10 GHz at room temperature (23° C.±5° C.) by the cavity resonator method using a permittivity measuring device provided by AET, Inc. The measurement results are shown in Tables 1 and 2.

TABLE 1

|  |  |  | Comparative example 1-1 | Example 1-1 | Example 1-2 | Example 1-3 | Example 1-4 | Example 1-5 | Comparative example 1-2 |
|---|---|---|---|---|---|---|---|---|---|
| Polyolefin resin | Homo PP | E100GV | — | — | — | — | 60 | — | — |
|  | Block PP | E150GK | 85 | 85 | 65 | 60 | — | 60 | 60 |
|  | Modified homo PP | 3200 | — | — | 10 | 10 | 10 | 10 | 10 |
|  | LDPE | 3530 | — | — | — | 10 | 10 | 10 | 10 |
| Flexible resin | TPO | R110E | 14 | 15 | 25 | 20 | 20 | 20 | 20 |
|  | SEBS | H1221 | — | — | — | — | — | — | — |
|  | Modified SEBS | M1943 | — | — | — | — | — | — | — |
| Flame retardant | Brominated flame retardant | 8010 | 30 | 30 | 30 | 30 | 30 | 30 | 9 |
|  | Mg(OH)$_2$ | YG-O | 30 | 30 | 30 | 30 | 30 | 45 | — |
| Inorganic filler | Titanium oxide | CR-63 | 15 | 15 | 15 | 15 | 15 | 15 | 15 |
| Flame retardant aid | Sb$_2$O$_3$ | PATOX-M | — | — | — | — | — | — | 3 |
| Antioxidant | Phenolic antioxidant | AO-20 | 2 | 2 | 2 | 2 | 2 | 2 | 2 |
|  |  | AO-60 | — | — | — | — | — | — | — |
| Processing aid | Metallic soap | EMS-6P | 0.5 | 0.5 | 0.5 | 0.5 | 0.5 | 0.5 | 0.5 |
| Flame retardancy test |  |  | ○ | ○ | ○ | ○ | ○ | ○ | x |
| Abrasion test |  |  | ○ | ○ | ○ | ○ | ○ | ○ | ○ |
| Low temperature winding test |  |  | x | ○ | ○ | ○ | ○ | ○ | ○ |
| Battery fluid resistance test |  |  | ○ | ○ | ○ | ○ | ○ | ○ | ○ |
| Dielectric characteristics | Permittivity |  | 2.80 | 2.80 | 2.80 | 2.80 | 2.80 | 3.00 | 2.40 |

|  |  |  | Example 1-6 | Example 1-7 | Comparative example 1-3 | Example 1-8 | Example 1-9 | Example 1-10 |
|---|---|---|---|---|---|---|---|---|
| Polyolefin resin | Homo PP | E100GV | — | — | — | — | — | — |
|  | Block PP | E150GK | 60 | 60 | 49 | 70 | 80 | 65 |
|  | Modified homo PP | 3200 | 10 | 10 | — | 10 | — | 10 |
|  | LDPE | 3530 | 10 | 10 | — | — | — | — |
| Flexible resin | TPO | R110E | 20 | 20 | 51 | — | — | 25 |
|  | SEBS | H1221 | — | — | — | 20 | — | — |
|  | Modified SEBS | M1943 | — | — | — | — | 20 | — |
| Flame retardant | Brominated flame retardant | 8010 | 10 | 80 | 30 | 30 | 30 | 30 |
|  | Mg(OH)$_2$ | YG-O | — | — | 45 | 30 | 30 | 30 |
| Inorganic filler | Titanium oxide | CR-63 | 60 | 60 | 15 | 15 | 15 | 15 |
| Flame retardant aid | Sb$_2$O$_3$ | PATOX-M | 3 | — | — | — | — | — |
| Antioxidant | Phenolic antioxidant | AO-20 | 2 | 2 | 2 | 2 | 2 | — |
|  |  | AO-60 | — | — | — | — | — | 2 |
| Processing aid | Metallic soap | EMS-6P | 0.5 | 0.5 | 0.5 | 0.5 | 0.5 | 0.5 |
| Flame retardancy test |  |  | ○ | ○ | ○ | ○ | ○ | ○ |
| Abrasion test |  |  | ○ | ○ | x | ○ | ○ | ○ |
| Low temperature winding test |  |  | ○ | ○ | ○ | ○ | ○ | ○ |
| Battery fluid resistance test |  |  | ○ | ○ | ○ | ○ | ○ | ○ |
| Dielectric characteristics | Permittivity |  | 3.50 | 3.40 | 3.00 | 2.90 | 2.90 | 2.90 |

According to Table 1, the resin composition of examples 1-1 to 1-10 includes 51 to 85 parts by mass of the polyolefin resin and 15 to 49 parts by mass of the flexible resin. Further, 10 to 80 parts by mass of the brominated flame retardant per 100 parts by mass of the total of the polyolefin resin and the flexible resin, and at least one of titanium oxide or magnesium hydroxide are included. In each of examples 1-1 to 1-10, the permittivity of the resin composition was in the range of 2.5 to 3.5, and the results of the flame retardancy test, the abrasion test, the low temperature winding test, and the battery fluid resistance test were good.

In contrast, according to Table 1, comparative example 1-1 had less than 15 parts by mass of the flexible resin, which adversely affected the low temperature resistance of the resin composition, and failed the low temperature winding test. Comparative example 1-2 had less than 10 parts by mass of the brominated flame retardant and failed the flame retardancy test. Comparative example 1-3 had less than 51 parts by mass of the polyolefin resin and more than 49 parts by mass of the flexible resin and failed the abrasion test.

TABLE 2

|  |  |  | Example 2-1 | Example 2-2 | Example 2-3 | Example 2-4 | Example 2-5 | Example 2-6 | Example 2-7 | Example 2-8 |
|---|---|---|---|---|---|---|---|---|---|---|
| Polyolefin resin | Homo PP | E100GV | 70 | 70 | 70 | — | 70 | 70 | 60 | — |
|  | Block PP | E150GK | — | — | — | 70 | — | — | — | 70 |
|  | Modified homo PP | 3200 | 15 | 15 | 15 | — | 15 | 15 | 15 | — |
|  | LDPE | 3530 | — | — | — | 15 | — | — | 10 | 15 |
| Flexible resin | TPO | R110E | 15 | 15 | 7.5 | — | 7.5 | 7.5 | 15 | — |
|  | Modified SEBS | M1943 | — | — | 7.5 | 15 | 7.5 | 7.5 | — | 15 |

TABLE 2-continued

|  |  |  |  |  |  |  |  |  |  |  |
|---|---|---|---|---|---|---|---|---|---|---|
| Flame retardant | Brominated flame retardant | 8010 | 10 | 30 | 30 | 30 | 30 | 30 | 30 | 30 |
|  | Mg(OH)$_2$ | YG-O | 35 | 45 | 30 | 30 | 30 | 30 | 10 | 10 |
| Inorganic filler | Titanium oxide | CR-63 | — | — | — | — | 10 | 30 | 60 | 10 |
| Flame retardant aid | Sb$_2$O$_3$ | PATOX-M | — | — | — | — | — | — | — | 10 |
| Antioxidant | Phenolic antioxidant | AO-20 | 5 | 5 | 5 | — | 5 | 5 | 5 | — |
|  |  | AO-60 | — | — | — | 5 | — | — | — | 5 |
| Processing aid | Metallic soap | EMS-6P | 0.4 | 0.4 | 0.4 | 0.4 | 0.4 | 0.4 | 0.4 | 0.4 |
| Flame retardancy test |  |  | ○ | ○ | ○ | ○ | ○ | ○ | ○ | ○ |
| Low temperature winding test |  |  | ○ | ○ | ○ | ○ | ○ | ○ | ○ | ○ |
| Battery fluid resistance test |  |  | ○ | ○ | ○ | ○ | ○ | ○ | ○ | ○ |
| Dielectric characteristics | Permittivity |  | 2.60 | 2.68 | 2.56 | 2.57 | 2.74 | 3.14 | 3.50 | 2.56 |

|  |  |  |  | Example 2-9 | Comparative example 2-1 | Comparative example 2-2 | Comparative example 2-3 | Comparative example 2-4 | Comparative example 2-5 |
|---|---|---|---|---|---|---|---|---|---|
| Polyolefin resin | Homo PP | E100GV | — | 70 | 70 | 70 | 70 | 77 |  |
|  | Block PP | E150GK | 70 | — | — | — | — | — |  |
|  | Modified homo PP | 3200 | — | 15 | 15 | 15 | 15 | 15 |  |
|  | LDPE | 3530 | 15 | — | — | — | — | — |  |
| Flexible resin | TPO | R110E | — | 15 | 15 | 15 | 15 | 8 |  |
|  | Modified SEBS | M1943 | 15 | — | — | — | — | — |  |
| Flame retardant | Brominated flame retardant | 8010 | 30 | — | — | — | — | 30 |  |
|  | Mg(OH)$_2$ | YG-O | 35 | 70 | 35 | 50 | 45 | 30 |  |
| Inorganic filler | Titanium oxide | CR-63 | 10 | — | — | — | — | — |  |
| Flame retardant aid | Sb$_2$O$_3$ | PATOX-M | 10 | — | — | — | — | — |  |
| Antioxidant | Phenolic antioxidant | AO-20 | — | 5 | 5 | 5 | 5 | 5 |  |
|  |  | AO-60 | 5 | — | — | — | — | — |  |
| Processing aid | Metallic soap | EMS-6P | 0.4 | 0.4 | 0.4 | 0.4 | 0.4 | 0.4 |  |
| Flame retardancy test |  |  | ○ | ○ | x | x | x | ○ |  |
| Low temperature winding test |  |  | ○ | ○ | ○ | ○ | ○ | x |  |
| Battery fluid resistance test |  |  | ○ | x | ○ | x | ○ | ○ |  |
| Dielectric characteristics | Permittivity |  | 2.83 | 2.95 | 2.58 | 2.75 | 2.68 | 2.58 |  |

According to Table 2, the resin compositions of examples 2-1 to 2-9 each include 51 to 85 parts by mass of the polyolefin resin, and 15 to 49 parts by mass of the flexible resin. Further, 10 to 80 parts by mass of the brominated flame retardant per 100 parts by mass of the total of the polyolefin resin and the flexible resin, and at least one of titanium oxide or magnesium hydroxide are included. In each of examples 2-1 to 2-9, the permittivity of the resin composition was in the range of 2.5 to 3.5, and the results of the flame retardancy test, the low temperature winding test, and the battery fluid resistance test were good.

According to Table 2, comparative example 2-1 had no brominated flame retardant included, ensured the flame retardancy due to the excess magnesium hydroxide, but failed the battery fluid resistance test. Comparative examples 2-2 and 2-4 had the content of magnesium hydroxide 45 parts by mass or less but failed the flame retardancy test due to no brominated flame retardant included. Comparative example 2-3 failed not only the flame retardancy test but also the battery fluid resistance test because it had greater excess of magnesium hydroxide than the conditions of comparative examples 2-2 and 2-4. Comparative example 2-5 had the content of the polyolefin resin more than 85 parts by mass, and the content of the flexible resin less than 15 parts by mass, which adversely affected the low temperature resistance of the resin composition, and failed the low-temperature winding test.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A resin composition comprising:
   one of 51 to 61 and 81 to 85 parts by mass of a polyolefin resin;
   one of 15 to 19 and 36 to 49 parts by mass of a flexible resin;
   one of 10 to 19 and 41 to 79 parts by mass of a halogenated flame retardant per 100 parts by mass of a total of the polyolefin resin and the flexible resin; and
   at least one of titanium oxide or metal hydroxide,
   the resin composition having a permittivity of 2.91 to 3.5 at a thickness of the resin composition at 0.15 mm to 0.22 mm,
   wherein the titanium oxide is included 10 parts by mass or more and 60 parts by mass or less per 100 parts by mass of the total of the polyolefin resin and the flexible resin.

2. The resin composition according to claim 1, wherein the metal hydroxide is magnesium hydroxide, and the halogenated flame retardant is a brominated flame retardant.

3. The resin composition according to claim 1, wherein the metal hydroxide is included more than 0 parts by mass and 45 parts by mass or less per 100 parts by mass of the total of the polyolefin resin and the flexible resin.

4. A communication cable comprising:
   two electric wires twisted,
      each of the electric wires comprising:
         a conductor with a cross-sectional area of 0.13 sq, and an insulation coating layer comprising: the resin composition according to claim 1, the insulation coating layer coating the conductor; wherein
the insulation coating layer has a thickness of 0.18 to 0.22 mm, and
the communication cable has a characteristic impedance of 90 to 110 Ω.

5. A wire harness comprising:
the communication cable according to claim 4.

6. The resin composition according to claim 3, wherein the metal hydroxide is included more than 0 parts by mass and 19 parts by mass or less per 100 parts by mass of the total of the polyolefin resin and the flexible resin.

7. The resin composition according to claim 1,
wherein the halogenated flame retardant is included at 10 to 19 parts by mass of the halogenated flame retardant per 100 parts by mass of a total of the polyolefin resin and the flexible resin.

* * * * *